United States Patent Office
3,672,733
Patented June 27, 1972

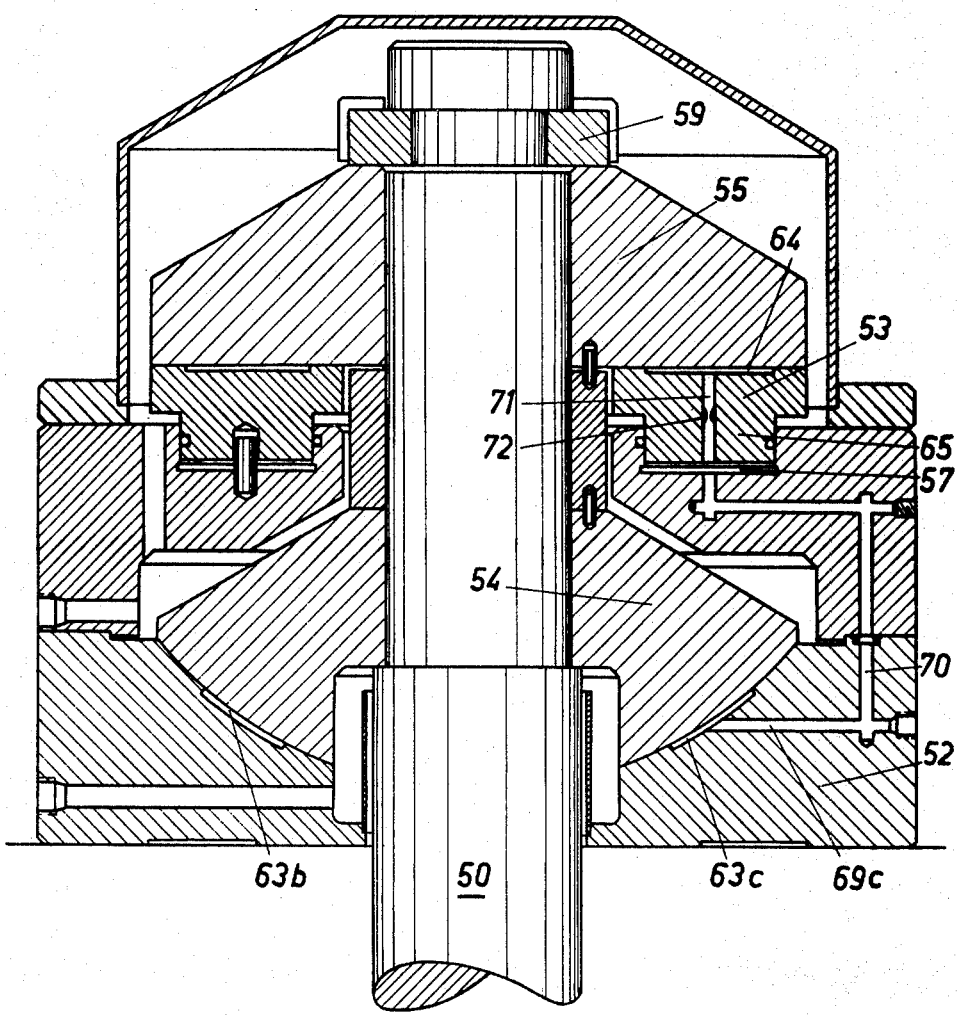

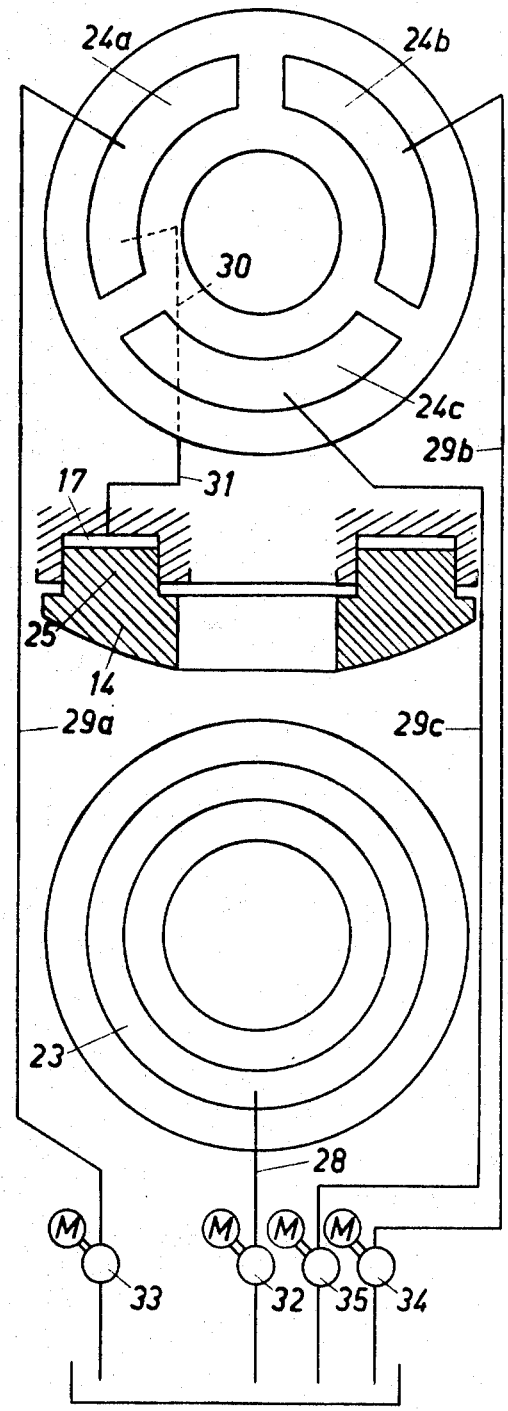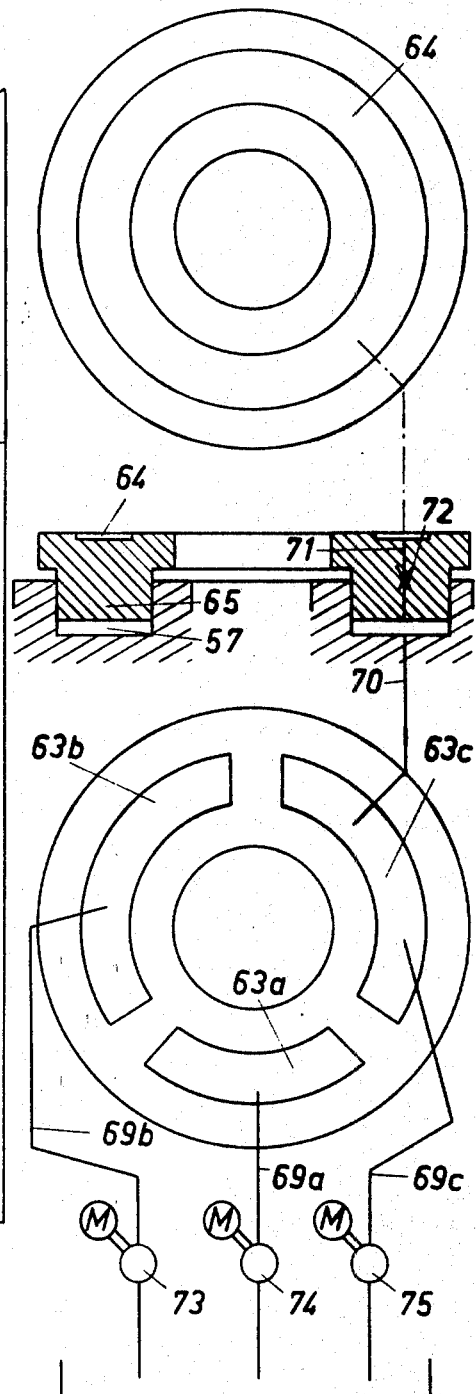

3,672,733
AXIAL BEARING
Torsten Henry Arsenius, Anders Christer Gustafsson, and Karl Goran Albin Halstedt, Goteborg, Sweden, assignors to SKF Industrial Trading and Development Company N.V., Amsterdam, Netherlands
Filed Mar. 1, 1971, Ser. No. 119,510
Claims priority, application Sweden, Mar. 2, 1970, 2,661/70
Int. Cl. F16c 17/04, 17/16
U.S. Cl. 308—9
8 Claims

ABSTRACT OF THE DISCLOSURE

In an axial hydrostatic bearing the load is carried by at least two members, each cooperating with a support in a fixed housing. At least one pocket connected to a source of pressure fluid is arranged at each pair of cooperating working surfaces between a carrying member and its support, and an adjusting mechanism including a piston working in a cylinder is fitted between the carrying members and operatively connected to one of them. The cylinder is connected to at least one pocket at the pair of working surfaces at the opposite member to receive pressure fluid at a pressure proportional to the pressure fluid therein. Hereby the axial position of the two carrying members will be automatically adjusted in relation to each other in accordance with occasional changes in the load, and each member will carry its alotted portion of the load.

BACKGROUND OF THE INVENTION

Within certain technical fields the development tends towards ever larger rotating units. As an example air preheaters for steam power plants may be mentioned. A known type of such preheater is the so called Ljungström pre-heater, which includes a body rotating about a vertical axis. The weight of this rotor is today considerable, 500 tons is in no way uncommon. In order to increase the capacity of the pre-heater it is desirable to make the rotors larger, which may mean an increase of the weight to twice that of the largest units hitherto known.

In doing this the bearings of the rotor will provide certain difficulties. With units of the hitherto usual sizes it has been possible to utilize spherical axial roller-bearings. There are no basic hinderances preventing the manufacture of a roller bearing for even larger loads, but the dimensions will be considerable and the manufacturing costs prohibitive. One manner of limiting the size of the bearing units is to divide the load between several smaller bearings. It has thus been proposed to divide the load equally between two roller bearings by means of a hydraulic servo mechanism comprising an annular piston. This arrangement however works with a definite enclosed fluid quantity, and the unavoidable leakage will result in a successive displacement of the axial bearing. Two sperical, axial bearings cooperating in this manner will furthermore provide a support which is rigid, that is the possibility for pendulum adjustment possessed by the single spherical bearing will be lost.

SUMMARY OF THE INVENTION

In order to take care of very big axial loads in a bearing it is according to the present invention proposed to use two or more carrying members fitted in tandem upon a common shaft, where at least one of said carrying members may have a part-spherical working surface as in the embodiment illustrated in the drawings. The said carrying members cooperate each with a support in a fixed housing enclosing the bearing, at least one pocket connected to a source of pressure fluid, in a manner common with hydrostatic bearings, being fitted at each pair of cooperating surfaces. A mechanism working in a cylinder is fitted between the carrying members and is operatively connected to one of them, the cylinder being connected to at least one pocket at the pair of cooperating working surfaces at the opposite member to receive pressure fluid at a pressure proportional to the fluid pressure therein, in order automatically to adjust the mutual axial position of the carrying members in accordance with occasional changes in the pressure of the fluid within said connected at least one pocket.

BRIEF DESCRIPTION OF THE DRAWINGS

FIG. 2 shows a corresponding view through a second embodiment of the bearing, provided with one part-spherical and one planar carrying member,
and
FIGS. 3 and 4 show the pressure fluid supply systems at the bearings according to FIGS. 1 and 2, respectively.

DESCRIPTION OF THE PREFERRED EMBODIMENTS

Figure 1:
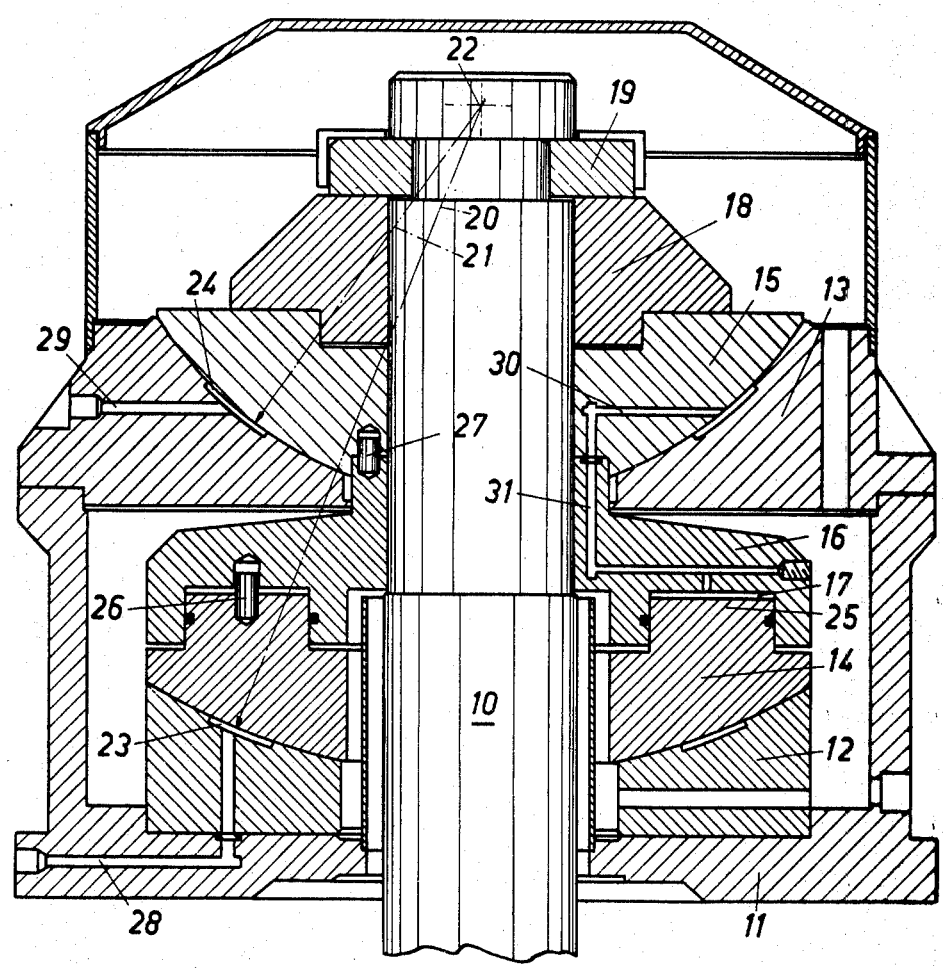
FIG. 1 shows a vertical section through a bearing comprising two part-spherical carrying members.

The bearing shown in FIG. 1 is intended to carry the vertical shaft 10 of a large rotor. This shaft is carried in a housing 11 enclosing two fixed supports 12 and 13, respectively. Two carrying members 14 and 15, respectively, are fitted on the shaft 10 and work in tandem thereby cooperating with a mechanism comprising a component 16 in which an annular cylinder 17 is formed.

A cross piece 18 fitted to the shaft rests upon the upper carrying member 15 and cooperates with a member 19 of arbitrary type, which permits a mounting and dismounting of the components of the bearing.

Both carrying members 14 and 15 have a part-spherical working surface. These surfaces, however, have different radii, 20 and 21, respectively, but a common centre 22 located upon the longitudinal axis of the vertical shaft 10.

The supports 12 and 13 have working surfaces mating with those of the pertaining carrying member. In the pair of working surfaces between a cooperating bearing member and its support, a number of pockets are formed in the manner common with hydrostatic bearings. These pockets are inthe lower support 14 denoted by reference 23, and in the upper support 15 denoted by reference 24.

The portion of the carrying member 14 remote from its working surface is formed as an annular piston 25 designed to cooperate with the annular cylinder 17 formed in the intermediate component 16. The latter is locked against turning movement in relation to the lower and the upper carrying members by the aid of pins 26 and 27, respectively.

Pressure fluid is supplied to the working surfaces at the lower carrying member 14 through a conduit 28, and to the working surfaces at the upper carrying member through a conduit 29. A passage 30 is formed in the upper carrying member 15, which is connected to a further passage 31 in the intermediate body 16, in such a manner that the cylinder 17 will be connected to the pockets 24 in the upper pair of working surfaces.

The hydraulic system for the embodiment shown in FIG. 1 is illustrated in FIG. 3, which shows the principal arrangement of the pockets in the working surfaces, as well as a cross section through the lower support member.

As is evident from FIG. 3 a single annular pocket 23 is formed in the working surface of the lower support. In the working surface of the upper support three arc-formed pockets 24a, b and c are arranged in such a manner that they together form an annulus corresponding to the annular pocket 23, but where the pockets are separated by portions of the plain working surface. Each of the pockets 23 and 24a, b, c, respectively, are supplied with pressure fluid from its own pump 32 and 33, 34 and 35, respectively, by way of conduits 28 and 29a, b, c.

Alternatively a common pump may be used, which by way of fluid governing means comprisng valves or throttling members will supply measured quantities of fluid to each pocket. By way of the passages 30 and 31 the cylinder 17 during the rotation of the carrying members will in turn be connected to each of the pockets 24a, b and c. The working of a hydrostatic bearing is well known and will not have to be explained in detail here. It will be sufficient to refer to the carrying capacity. In a single acting bearing this is equal to the product of the pressure of the fluid within the pocket, and the area of the efficient carrying surface projected upon a plane perpendicular to the direction of the load.

The expression efficient carrying surface will here be understood as the area defined by the middle lines of the two annular outflow clearances surrounding each annular pocket. The internal and the external diameter, respectively, of the annular piston 25 is chosen in such a manner that the area of the piston will correspond to the efficient carrying surface at the support member 15 projected upon a horizontal plane. Hereby the two carrying members will support equal parts of the total load. This activity will automatically be brought about due to the fluid pressure working on the annular piston 25, which is equal to that in the pockets 24a, b, and c respectively, at the upper working surface.

This equal carrying capacity of the two support members means that the heights of the out-flow clearances in the pair of working surfaces will be adjusted in such a manner that the product of the pressures within the pockets and the efficient carrying surface of the two support members will be equal. The pressures within the three pockets 24a, b and c, respectively, are equal when the carrying member is subjected to a pure axial load, but will be different if the direction of load differs therefrom. As the connection passage 30, 31 is rotated it will successively be subjected to the pressure in the three pockets, and due to the resistance to flow in the passage an intermediate pressure will be formed within cylinder 17. The flow through passages 30 and 31 will during use be determined by the leakage passing the sealings at the annular piston.

This outflow is unimportant, as it is small compared to the outflow through the clearances at the working surfaces.

When no fluid pressure is available the total load will rest upon the upper support 13. When the pumps start to work pressure fluid will be supplied to pockets 24, and by way of a passage 30, 31 to cylinder 17, whereupon also the lower support 12 will take part in carrying the load. The adjusting mechanism is thus operatively connected to the lower carrying member and works in response to the pressure prevailing at the upper member.

The embodiment shown in FIG. 2 differs from that according to FIG. 1 therein, that the upper carrying member is provided with a planar working surface. The vertical shaft is here denoted by 50, the lower part-spherical support member is denoted by 54, and the upper planar carrying member by 55. This upper carrying member furthermore has the same function as member 18 in the previous embodiment, and is connected to shaft 50 by suitable means 59. The working surface in the lower support 52 has the same radius as that of the pertaining carrying member.

In the latter embodiment the surface cooperating with the upper carrying member 55 is designed as an axially movable element 53, in which a piston 65 is formed. This piston works in a cylinder 57, which is formed in a fixed part of the housing.

The hydraulic system is illustrated in FIG. 4. In this embodiment there is an annular pocket 64 at the working surface between the upper carrying member 55 and element 53. In the working surface between the lower part-spherical carrying member 54 and support 52 three arc-formed pockets 63a, b and c are arranged. These are each supplied with pressure fluid from a pump 73, 74 and 75 by way of conduits 69a, b and c. The conduit 69c and pocket 63c connected thereto is furthermore by way of passage 70 in the housing connected to cylinder 57. From the latter a further passage 71 in the element 53 leads to the annular pocket 64. A restriction 72 fitted in passage 71 in order to create a small pressure difference between the pocket in the working surface and that in the annular cylinder, whereby a lifting of the annular piston is secured as soon as the pump is started. The adjusting mechanism is here operatively connected to the upper member and works in response to the pressure prevailing at the lower member.

A bearing according to FIG. 2 is suitable on such occasions, where it may be expected that the direction of the load will show comparatively small deviations from the vertical axis. A possible pendulum movement will here be possible only within the movement permitted by the tilting of the annular piston, which in turn depends upon the clearance between the piston 65 and its cylinder.

What I claim is:

1. In an axial hydrostatic bearing including at least two carrying members fitted in tandem upon a common vertical shaft, each of said carrying members cooperating with a mating working surface in a support in a fixed housing enclosure the bearing and where at least one pocket connected to a source of pressure fluid is arranged at each pair of cooperating working surfaces between a carrying member and the pertaining support, the improvement that a mechanism including a piston working in a cylinder is fitted between the carrying members and is operatively connected to one of them, the cylinder being connected to at least one pocket at the pair of cooperating working surfaces at the opposite member to receive pressure fluid at a pressure proportional to the fluid pressure therein, in order automatically to adjust the mutual axial position of the carrying members in accordance with occasional changes in the pressure of the fluid within said connected, at least one pocket.

2. The axial bearing according to claim 1, in which the piston is designed as an annulus encircling the shaft.

3. The axial bearing according to claim 1, in which the working surfaces of two cooperating carrying members are formed as parts of different-diameter spheres having a common centre located upon the longitudinal axis of the shaft.

4. The axial bearing according to claim 3 in which the cylinder of the piston is connected to at least one pocket at the pair of working surfaces pertaining to the upper carrying member.

5. The axial bearing according to claim 1 in which an upper carrying member is formed with a planar working surface, the cylinder being connected to at least one pocket at the pair of working surfaces pertaining to a lower, part-spherical member.

6. The axial bearing according to claim 3, in which one annular pocket is formed at the pair of working surfaces pertaining to the lower carrying member, and in which at least two arc-formed pockets, separated by portions of the plain working surface arranged in annular configuration at the pair of working surfaces pertaining to the upper carrying member, supply passages of a number equal to that of the pockets being formed in the pertaining support, a further passage in the upper carrying member opening into its working surface opposite to the pockets being connected to the cylinder of the adjusting mechanism.

7. The axial bearing according to claim 5, in which one annular pocket is formed at the pair of working surfaces pertaining to the upper, planar carrying member, and in which at least two arc-formed pockets, separated by portions of the plain working surface are arranged in annular configuration at the pair of working surfaces pertaining to the lower carrying member, a passage in the housing supplying pressure fluid to the cylinder of the adjusting mechanism and through a further passage therefrom to the annular pocket at the planar working surfaces.

8. The axial bearing according to claim 2 in which the working surface of the annular piston is substantially equal to the efficient carrying surface of the pockets in the carrying member with which the piston is connected, as projected upon a plane perpendicular to the direction of the loads, the efficient carrying surface being the area defined by the middle lines of the annular outlet clearances surrounding each pocket in the pair of working surfaces.

References Cited
UNITED STATES PATENTS 3,326,612   6/1967   Schaefer _____ 308—160

MARTIN P. SCHWADRON, Primary Examiner

F. SUSKO, Assistant Examiner

U.S. Cl. X.R.

308—160